UNITED STATES PATENT OFFICE.

WILLIAM ANTHONY SHAW, OF NEW YORK, N. Y., ASSIGNOR OF ONE-HALF HIS RIGHT TO L. H. ROGERS, OF SAME PLACE.

IMPROVEMENT IN COMPOUND METALS AND ALLOYS FOR SOLDER.

Specification forming part of Letters Patent No. 150,623, dated May 5, 1874; application filed April 28, 1874.

*To all whom it may concern:*

Be it known that I, WILLIAM ANTHONY SHAW, of the city, county, and State of New York, have invented certain new and useful Improvements in Compound Metals or Alloys, of which the following is a specification:

This invention relates to metallic compounds or alloys, especially adapted for use as solder; and the object is to produce the same of a better quality, and at a less cost and expense than has hitherto been practicable. This object is accomplished by economizing in the amount of tin or other expensive metal or metals entering into the composition of the solder, and at the same time producing an article that will flow as freely as a more expensive mixture, when heat is applied, and, possessing greater tensile strength, be superior in quality to that heretofore used. The improved processes and materials thereby produced enable metals to be soldered together, forming joints of much greater strength than heretofore, and such joints possessing a higher melting-point, and being less liable to be weakened or damaged when exposed to heat, as in domestic utensils, &c. These results are attained by uniting a core of relatively coarse solder, or one containing a less proportion of tin, with an outside covering or envelope of fine solder, or one with a greater proportion of tin, &c. For some purposes this order may be reversed—that is, the fine solder may be placed inside and covered with an envelope of coarser metal. When heat is applied to such a compound the finer metal or alloy will melt easily, and dissolve and melt down the coarser metal or alloy, causing the entire combination to melt and flow as readily as if it were composed entirely of fine solder. These combinations of metals or alloys may be made in the form of bars or rods, wires or ingots, or pellets of any desired shape and size. Bars, tubes, or rods may be made by the use of the hydraulic or other power-press by casting within a cylinder or receptacle an ingot of coarse solder, surrounded by a covering of fine solder, or vice versa, and pressing all out through a die placed either at the bottom or top of such cylinder, either within the die-holder or the plunger used, as in the various methods for making lead and other pipes; or the improved solder may be cast into ingots and rolled or drawn out into bars or wires by any of the forms of rolling-mills or draw-benches used for manufacturing bars or wires. Wires may be made independently of different alloys and twisted into ropes or cables of the improved combination.

Another method of manufacturing such solder is as follows: A plate or slab is formed of the compound materials in similar manner to the manufacture of tin-foil, rolled to the required thickness, and cut into strips or bars by any of the well-known devices for cutting up sheet metals.

The new manufacture may be cast into vertical or horizontal molds, provided with a suitable arrangement of cores, and such castings compressed, if required, or simply discharged, as cast, from the molds.

There may be three or more different alloys united—for instance, the interior core may consist of what is known as fine solder, surrounded with a coarser solder, and the whole inclosed within a shell of fine solder. Not only solders or alloys composed of tin and lead in various proportions may be used together, but solders of different metals; for instance, one portion may be of lead and tin, another of lead, tin, and cadmium, or of lead, tin, and bismuth, or of any other suitable combinations of metals.

This invention may also be carried into effect by casting bars, &c., separately, and making up the same into bundles or fagots, by binding, soldering, or joining in any manner, so that the combination may be melted simultaneously, or nearly so, in using the same.

Such combined solders may be made into the forms of pellets, cubes, or drops, either by cutting up rods or bars, or by the well-known means of making pellets, &c., in manufacturing confectionery.

I do not limit myself to any particular configuration or form of ingot, nor to any special compound or alloy, since it is manifest that I can use all solders or alloys that may be combined, so that the alloy melting at the lowest temperature will dissolve down and assist the melting of its associates, thereby economizing in the cost of improving the qualities of solders. Bars or pieces of any desired form may be made separately of different grades, and simply placed in juxtaposition when used in the act of soldering.

Such pieces can be tongued and grooved or made to be locked together by any suitable device. Tubes of fine metal may be filled with grains of coarser metal. Rosin may be combined with such grains in the filling.

What I claim, and desire to secure by Letters Patent, is—

1. The within-described compound solder, consisting of two or more solders of different grades or fusing-points, united in one piece, as a new article of manufacture.

2. Associating, uniting, or connecting together alloys or solders of different grades, mixtures, and proportions, for the purposes stated.

3. The soldering or joining metals by means of solders composed of different alloys, or alloys of different proportions, so placed or connected and applied that the more fusible components thereof shall assist in melting down the less fusible components, and causing the same to flow freely, as set forth.

In testimony whereof I have hereunto signed my name this 27th day of April, A. D. 1874.

WM. ANTHONY SHAW.

Witnesses:
  EWELL DICK,
  HENRY R. ELLIOTT.